April 29, 1969      R. B. VALLEY ET AL      3,441,848
PARTICLE LENGTH MEASURING APPARATUS
Original Filed Feb. 28, 1964
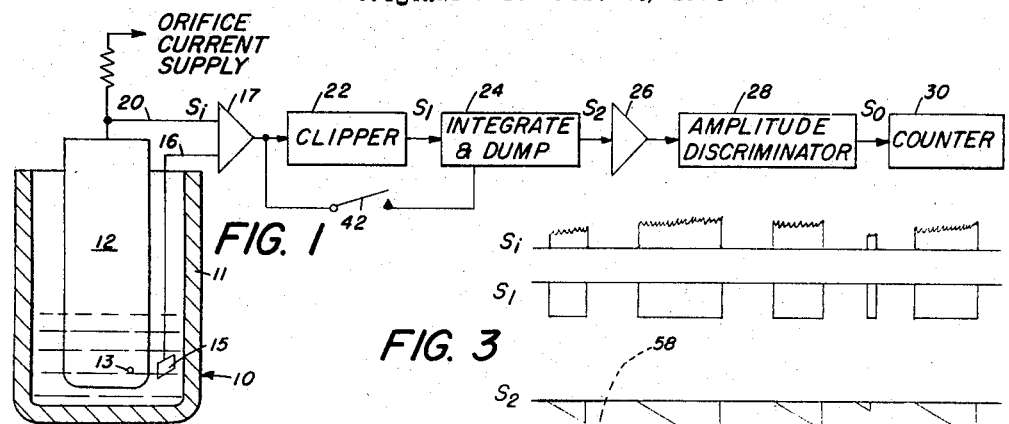
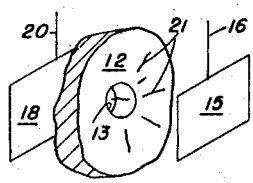
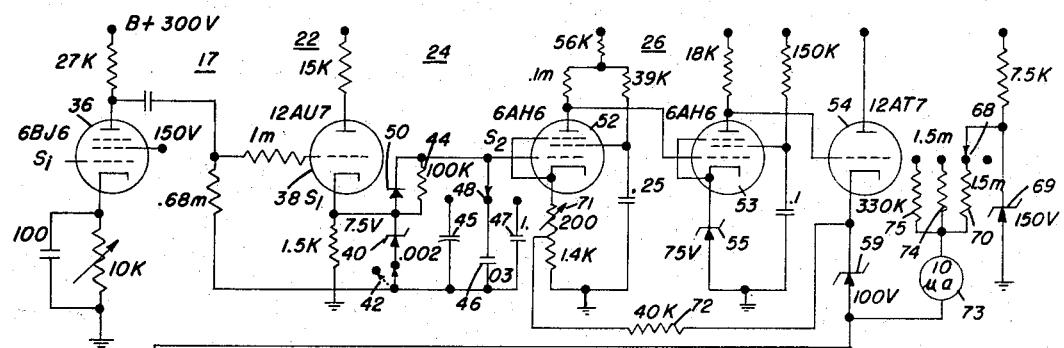
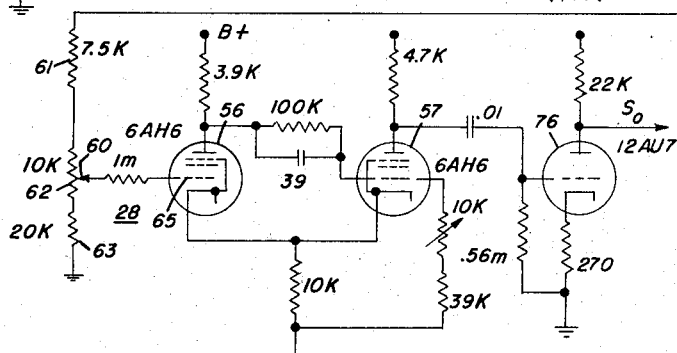
RICHARD B. VALLEY
THEODORE H. MORSE
INVENTORS
BY R. Frank Smith
David P. Ogden
ATTORNEYS

United States Patent Office 3,441,848
Patented Apr. 29, 1969

3,441,848
PARTICLE LENGTH MEASURING APPARATUS
Richard B. Valley and Theodore H. Morse, Rochester, N.Y., assignors, by mesne assignments, to Coulter Electronics, Hialeah, Fla., a corporation of Illinois
Continuation of application Ser. No. 348,239, Feb. 28, 1964. This application Apr. 29, 1968, Ser. No. 725,228
Int. Cl. G01n 27/02; H03k 5/01
U.S. Cl. 324—71                    12 Claims

ABSTRACT OF THE DISCLOSURE

Fiber or particle studying apparatus employing a particle studying circuit wherein electrical insulating means define an orifice through which separated portions of a particle containing fluid sample may communicate, and electrical circuit means establishing a completed circuit between the respective portions by way of the fluid in said orifice; said circuit means, due to the measurably different electrical characteristics of the fluid and the particles suspended therein, producing detectable pulses as particles are caused to pass through said orifice. The apparatus further including wave-shaping electrical circuit means for receiving the aforementioned pulses and deriving constant amplitude signals therefrom and then converting said signals into saw-tooth wave forms the amplitudes of which are a function of the duration of said pulses and thereby representative of particle length; and means, receptive of said saw-tooth wave forms, capable of detecting and counting those wave forms having an amplitude greater than a pre-selected level.

---

This application is a continuation of our application Ser. No. 348,239, filed on Feb. 28, 1964, now abandoned without prejudice in favor of this application.

The present invention relates to fiber or particle length measuring apparatus and more particularly to a combination of a particle counter and a pulse length measuring and discriminating network for measuring particle length and volume.

Counters of various types are well known in the prior art and serve functions such as counting the number of revolutions of a screw threading machine or a solenoid winding machine as well as the more sophisticated counting arrangements used in various types of computers and the like. One means for counting particles suspended in a fluid is illustrated in the United States Letters Patent 2,656,508 issued Oct. 20, 1953, to W. H. Coulter. This counter is arranged to pass a fluid containing particles through a small orifice connecting two vessels each containing an electrode. Except for the orifice the vessels' fluids are electrically insulated. Since the orifice is relatively small, the presence of a particle within the orifice changes the conductivity between the electrodes in accordance with the conductivity of the particles to provide a pulse corresponding to the duration of residence of each particle in the orifice and particle size or volume. By various electrical circuit means, these pulses may be counted so that the number of particles per cubic measurement of the fluid is ascertainable. Such a counter forms a part of our invention.

In the paper-making art, one of the basic variables encountered in manufacture of extremely high quality and uniform paper is the obtaining of a pulp mix having known relative sizes of wood particles therein. One major aim of refining paper is to "shorten" the fiber or particle length of raw pulp to improve forming of paper. Various manufacturing techniques are known to change the relative sizes of the fibers with one of the simplest being to beat the pulp to further break up the fibers and obtain an average smaller fiber mix. However, in order to determine the amount of beating necessary and the effectiveness of such beating, it is, of course, necessary to determine the fiber size before beating and after various predetermined beatings.

Two of the conventional methods of determining the fiber size use microscopic counting or fiber classification. Although fairly reliable, microscopic measurement techniques are slow and expensive and suffer from an inability to study in detail distributions below 0.2 mm. Because of the nature of this process, operator skill and judgment are required, so that operator fatigue may influence a count substantially. On the other hand, the fiber classification method is rapid but gives only one or several point results which, it is hoped, are reasonably related to the over-all fiber length distribution of the given system. Again, operator skill and judgment are requisite. When it is desired to provide fine papers of precisely known quality at competitive costs, it is necessary to use a precise measuring technique that is also rapid. Obviously, simple and reliable instruments for accomplishing such measurement are needed in this art. Because of the difficulty of obtaining rapid and reliable determination of particle-fiber length, many skilled in the paper-making art, merely attempt to hold such length as a constant and work with other variables to attain quality control.

Therefore, an object of the present invention is to provide a new, simple and reliable particle length measuring apparatus.

A further object is to provide a simple and reliable fiber volume measuring arrangement.

In accordance with one embodiment of our invention, a particle counter arrangement of the general type marketed by Coulter Electronics, Inc. of Hialeah, Fla. under the trademark "Coulter Counter" is utilized to provide electrical pulses representative of pulp fibers passing through an orifice. We have found that long fibers or particles flowing through an orifice tend to align themselves with the direction of fluid flow whereby they pass through the orifice lengthwise and the detection of pulse duration is a measurement of their length. The resulting pulses are then amplified and clipped to provide rectangular waves of a fixed amplitude having a duration corresponding to the duration of the fiber residence time; hence, fiber length. The clipped pulses are then sorted in accordance with their length by applying them to a ramp wave generating system (sometimes referred to as a saw tooth generator), which integrates the pulses so that the longer pulses have the greater peak amplitude. The train of pulses is then applied to an amplitude discriminator which may be arranged to detect pulses greater than any given amplitude within the mix to thereby determine the number of fibers longer than a preselected length. By selecting several amplitudes the discriminator will rapidly provide counts of fibers at several points of a fiber length distribution curve.

The subject matter which is regarded as our invention is particularly pointed out and distinctly claimed in the concluding portion of this specification. The invention, however, as to its organization and operation, together with other objects and advantages thereof, will best be understood by reference to the following description, taken in connection with the accompanying drawing, in which:

FIG. 1 is a block diagram illustrating the present invention;

FIG. 2 is a detailed broken view of the orifice shown in FIG. 1;

FIG. 3 illustrates typical wave forms within the electrical portion of the circuit shown in FIG. 1; and FIG. 4 is a circuit diagram illustrating in detail one arrangement of the electronic components employable in our invention.

Referring now to the drawing, wherein like numbers refer to similar parts, we have shown in FIG. 1 a particle detector 10 having an outer vessel 11 and an inner vessel 12 with a small orifice 13 mechanically and electrically coupling the fluids thereof together. Although orifices as small as 150 microns in diameter will usually pass pulp fibers without clogging, we have found that orifices as large as 560 microns in diameter do not cause sufficient overlap in fiber pulse signals to be detrimental. The length of the orifice or thickness of the inner vessel 12 is preferably about 1 mm.

In the outer vessel 11 near the orifice 13 is an electrode 15 coupled by a signal line 16 to an amplifier 17. As shown more clearly in FIG. 2, another electrode 18 resides within the vessel 12 and is coupled by a signal line 20 to the amplifier 17. As shown in FIG. 1, a current supply is coupled across the orifice 13 via electrodes 15 and 18 and signal lines 16 and 20. In order to reduce interference with fiber flow, we prefer that the electrode 15 be embedded in, or secured to, the inner surface of the outer vessel 11. The electrode 18 may be similarly embedded in the wall of inner vessel 12.

During the counting operation, a continuous and uniform pressure differential is developed for a predetermined time (or volume of flow) through the orifice 13 whereby a known fluid volume flows at a constant rate between the two vessels. The pressure may be developed by a gravity with the difference of fluid levels affecting the pressure differential or by the use of a mercury column drawing fluid through the orifice 13. Obviously other types of pressure differential means such as pumping means might be used with our invention. However, these systems tend to be more expensive than gravity feed systems without greatly increasing the precision of the fluid flow rate.

During the fluid flow, a signal is developed between the electrodes 15 and 18 in accordance with the electrical impedance of the fluid therebetween. The impedance of the volume of the suspension effectively within the orifice 13 varies whenever a particle or fiber 21 flows therethrough. The extent of the impedance variation is proportional to the difference between electrical conductivity of the fluid and the particle and also is proportional to the volume of the particle effectively within the orifice. According to the basic operating principles of a "Coulter Counter," the amplitude of a particle derived signal, such as at $S_i$ in FIG. 3, is proportional to the volume of the particle in the orifice 13, and the duration of the particle is proportional to the duration of the particle residence in the orifice. Thus, if the particles which elicited the signals $S_i$, which signals are shown to be of similar amplitude, were each shorter than the length of the orifice, then each particle would have the same order of volume, but they would be of different lengths. Now, if the particles are of lengths significantly longer than the orifice, signal amplitude alone is not an exact measure of particle volume, since some of the particle is external the orifice and does not proportionately affect the signal. In such circumstance, signal amplitude and signal duration combine to provide an accurate measure of particle size and volume. Signal amplitude in such conditions is thus proportional to particle cross section.

In accordance with one embodiment of our invention, the signals $S_i$ are amplified in the amplifier 17 and applied to a clipper circuit 22 to develop rectangular wave forms $S_1$ (FIG. 3) having durations equal to those of the signals $S_i$. The amount of amplification necessary depends to some extent on the relative size of the particles 21 and the orifice 13. These rectangular wave forms $S_1$ are then integrated in an integrate and dump circuit 24 to develop saw tooth waves $S_2$ having amplitudes representative of the duration of the rectangular waves. After further amplification in an amplifier 26, the saw tooth wave forms $S_2$ are applied to an amplitude discriminator 28 so that pulses having an amplitude greater than a predetermined amount will provide trigger pulse output signals $S_o$. The output signals $S_o$ are applied to a pulse counter 30. The counter 30 is most easily exemplified by decimal counting units marketed as DCU's by Berkley Division of Beckman Instruments, Inc. Both the particle detector 10 and the counter 30 are commercially available in the above-mentioned "Coulter Counter" and described in some detail in the above-mentioned patent.

As should now be clear for the purposes set forth herein, specifically the measuring of fiber lengths in a paper pulp, simply counting the number of fibers per unit volume of the pulp does not provide sufficient information to determine the quality of the pulp or the resulting paper. In other words, similar particle counts are obtainable from mixes having very short fibers and a relatively low concentration of fibers in the fluid and fairly long particles in a fluid wherein the fiber concentration is much greater. Despite similar counts, the resulting papers of these two pulps may have few if any similar characteristics. Therefore, it is necessary to develop the detection signal information $S_i$ so that it becomes distinguishable as a function of the several sizes of fibers being detected.

The specific circuitry of the several circuits indicated as blocks in FIG. 1 is illustrated in FIG. 4 wherein the amplifier 17 uses a 6BJ6 vacuum tube 36 arranged to provide class A amplification. The clipper 22 is accomplished in the circuit of a 12AU7 triode 38 coupled as a cathode follower with clipping accomplished by a Zener diode 40 coupled in circuit by a selector switch 42. A Zener diode is an electronic device that becomes conductive at a predetermined voltage such as 10 volts or 100 volts. While conductive, the Zener diode maintains a constant voltage drop (e.g. 10 or 100 volts). The Zener diode 40 is selected to provide a 7½ volt drop to clip the rectangular wave form $S_1$ at that level. The integration circuit as indicated at 24 in FIG. 4 includes a large resistor 44 and a plurality of capacitors 45, 46 and 47 selectable by a switch 48 to provide ramp waves of a selected slope. The dumping of the charged capacitors is accomplished by a diode 50 which dumps through the Zener diode 40 to the ground terminal of the capacitors 45, 46 and 47. The amplifier 26 takes the form of a feedback amplifier using a pair of 6AH6 vacuum tubes 52 and 53 which apply the amplified output signal to a 12AT7 triode 54 operated as a modified cathode follower. The tube 53 has its cathode potential maintained at 75 volts by a Zener diode 55 to attain a suitable voltage level input to the grid of the triode 54.

The discriminator portion of the circuit includes another pair of 6AH6 tubes 56 and 57 operated as a Schmitt trigger (often called a one-shot multivibrator) and receptive of signal information from the cathode of the triode 54. The trigger voltage of the circuit is at a voltage level indicated in a dashed line at 58 (FIG. 3) in accordance with the setting selected of a voltage tap 60 of a potentiometer 62. As shown in FIG. 4, the cathode of the triode 54 is coupled to ground through a resistance network including resistors 61, 62 and 63 with a control grid 65 of the tube 56 being coupled to the potentiometer 62.

In order that the accuracy of the circuit is optimum, a calibration circuit is couplable in parallel with the resistance network 61–63 by a selector switch 68 and includes another Zener diode 69. We prefer that the Zener diode 69 have a precisely controlled voltage drop when in use, as by being maintained at a constant temperature in an oven. The steady state no signal calibration of the circuit is accomplished by coupling the switch 68 to a large resistor 70 and adjusting a cathode balancing resistor 71 in circuit with the feedback amplifier tube 52 to zero current through a microammeter 73. The feedback signal is attained through a resistor 72 coupling the cathodes of the tubes 52 and 54 and helps to stabilize the circuit gain during operation. Zero adjustment using the smaller resistors 74 and 75 respectively prepares the entire circuit for highly selective operation.

The Schmitt trigger circuit (56-57) has impedance components selected to provide high sensitivity without loss of stability. The final tube 76 of the circuit is primarily to invert the output signal so that it is acceptable to the specific counter being used. Also, being a triode, considerable signal amplification is feasible in this tube.

In addition to determining the particle distribution by taking several reading with the circuits operating as described above, it is a simple matter to determine the particle volume using our invention. By disconnecting the Zener diode 40 (switch 42) the circuit of the 12AU7 (38) is converted into a simple amplifier rather than a clipper whereby the capacitors 45-47 are charged as a function of both the duration and the amplitude of the signals $S_1$. Since, as earlier described, the volume or cross section of the particles, depending upon their lengths, determines the amplitudes of the signals $S_1$, the amplitudes of the resulting wave forms $S_2$ are substantially proportional to the particle volumes, and the total particle volume may be measured by our apparatus.

While we have shown and described particular embodiments of the present invention, other modifications may occur to those skilled in this art. For instance, it is, of course, feasible if not economically worthwhile, to provide several discriminators set to detect simultaneously several points of the particle length distribution curve. However, we have not found these circuitry modifications necessary for our purposes. We intend, therefore, to have the appended claims cover all modifications which fall within the true spirit and scope of our invention.

What is sought to be secured under United States Letters Patent is:

1. In particle studying apparatus including; electrical insulation means defining an orifice through which a fluid sample containing the particles to be studied passes at a controlled rate; and electrode means associated with said orifice and generating electrical pulses in response to the presence of particles in said orifice due to the measurably different electrical characteristics of said fluid and said particles; said pulses varying as a function of the size and duration of the passage of the particles through said orifice; wherein the improvement comprises means for monitoring and measuring particle length which include:
    (a) wave shaping electrical circuit means for receiving the pulses from said electrode means and therefrom deriving wave forms, the amplitudes of which are related to the duration of said pulses and thereby proportional to the length of the particles, said wave-shaping circuit means including;
        (i) clipping means for receiving said pulses and producing constant amplitude signals having durations equal to those of said pulses;
        (ii) an integration network receiving said constant amplitude signals and developing therefrom saw-tooth wave forms, the amplitudes of which are functions of the durations of said constant amplitude signals;
    (b) and means receptive of said saw-tooth wave forms for detecting and counting those wave forms which exceed a preselected amplitude.

2. Particle studying apparatus as defined in claim 1 wherein said means receptive of said saw-tooth wave forms include; a discriminating network that produces discrete outputs, each representing a particle of at least a given length; and means for recording said outputs.

3. Particle studying apparatus as defined in claim 2 wherein said discriminating network includes adjustable means so that studies can be obtained corresponding to a number of minimum particle lengths whereby a number of points of a particle length distribution curve can be compiled.

4. Particle studying apparatus as defined in claim 2 wherein said discriminating network includes a Schmitt trigger circuit triggerable by saw-tooth wave forms having an amplitude greater than a preselected level.

5. Particle studying apparatus as defined in claim 2 wherein said discriminating network has temporarily coupled thereto null adjustment means including a constant voltage device whereby said discriminating network will detect saw-tooth wave forms greater than an ascertainable predetermined amplitude.

6. Particle studying apparatus as defined in claim 1 wherein said integration network includes regulating means to provide selectively saw-tooth wave forms of differing slope so that shorter or longer pulses may develop wave forms having selectively different amplitudes.

7. Particles studying apparatus as defined in claim 1 further including means for bypassing said clipping means and causing the slops of said saw-tooth wave forms to vary accordinging to the amplitudes of said pulses so that the integration network provides saw-tooth wave forms having amplitudes which are a function of the volume of said particles.

8. In particle studying apparatus including; electrical insulation means defining an orifice through which a fluid sample containing the particles to be studied passes at a controlled rate; and electrode means associated with said orifice and generating electrical pulses in response to the presence of particles in said orifice due to the measurably different electrical characteristics of said fluid and said particles; said pulses varying as a function of the size and duration of the passag of the particles through said orifice; wherein the improvement comprises means for monitoring and measuring particle length which include:
    (a) wave shaping electrical circuit means for receiving the pulses from said electrode means and therefrom deriving wave forms, the amplitudes of which are related to the duration of said pulses and thereby proportional to the length of the particles, said wave-shaping circuit means including;
        (i) clipping means for receiving said pulses and producing constant amplitude signals having durations equal to those of said pulses;
        (ii) an integration network receiving the constant amplitude signals and developing therefrom saw-tooth wave forms the amplitudes of which are functions of the durations of said signals, said integration network further including regulating means to vary the slope of said saw-tooth wave forms so that shorter or longer pulses may develop wave forms having selectively different amplitudes;
    (b) a discriminating network receptive of said saw-tooth wave forms and including circuit means triggerable to produce discrete outputs by those wave forms having an amplitude which exceeds a preselected level, each of said outputs thereby representing a particle of at least a given length;
    (c) and means for counting said outputs so produced.

9. Particle length monitoring apparatus for use in particl studying apparatus including; electrical insulation means defining an orifice through which a fluid containing particle to be studied passes at a constant rate; electrode means associated with said orifice for generating electrical pulses in response to the presence of particles in said orifice, due to the measurably different electrical characteristics of said fluid and said particles; said pulses varying as a function of the size and the duration of the passage of said particles through said orifice; said particle length monitoring apparatus being comprised of:
    (a) wave shaping electrical circuit means for receiving the pulses from said electrode means and therefrom deriving wave forms, the amplitudes of which are related to the duration of said pulses and thereby proportional to the length of the particles; said wave-shaping circuit means including;
        (i) clipping means for receiving said pulses and producing constant amplitude signals having durations equal to those of said pulses;

(ii) an integration network receiving said constant amplitude signals and developing therefrom sawtooth wave forms, the amplitudes of which are functions of the durations of said constant amplitude signals;

(b) and means reseptive of said saw-tooth wave forms for detecting and counting those wave forms which exceed a preselected amplitude.

10. Particle length monitoring apparatus as defined in claim 9 wherein said means receptive of said saw-tooth wave forms include; a discriminating network that produces discrete outputs, each representing a particle of at least a given length; and means for recording said outputs.

11. In particle studying apparatus including; electrical insulation means defining an orifice through which a fluid sample containing the particles to be studied passes at a controlled rate; and edectrode means associated with said orifice and generating electrical pulses in response to the presence of particles in said orifice due to the measurably different electrical characteristics of said fluid and said particles; said pulses varying as a function of the size and duration of the passage of the particles through said orifice; wherein the improvement comprises means for monitoring and measuring particle length which include:

(a) wave shaping electrical circuit means for receiving the pulses from said electrode means and therefrom deriving wave forms, the amplitudes of which are related to the duration of said pulses and thereby proportional to the length of the particles, said wave-shaping circuit means including;

(i) clipping means for receiving said pulses and producing constant amplitude signals having durations equal to those of said pulses;

(ii) a duration to amplitude converting network receiving said constant amplitude signals and developing therefrom wave forms, the amplitudes of which are functions of the durations of said constant amplitude signals;

(b) and means receptive of said wave forms for detecting those wave forms which exceed a preselected amplitude.

12. Particle studying apparatus as defined in claim 11 wherein said duration to amplitude converting network includes signal integration circuitry and wherein recording means is coupled to the output of said receptive means.

References Cited

UNITED STATES PATENTS

| | | | |
|---|---|---|---|
| 2,731,202 | 1/1956 | Pike | 235—92 |
| 2,994,822 | 8/1961 | Isley | 324—68 |
| 2,999,168 | 9/1961 | Henry. | |
| 3,028,501 | 4/1962 | Lamparter. | |
| 3,035,478 | 5/1962 | Laycak. | |
| 3,127,505 | 3/1964 | Gustavson | 235—92 |
| 3,233,173 | 2/1966 | Lees et al. | 324—71 |
| 3,255,407 | 6/1966 | Straszewicz | 324—71 |
| 3,271,672 | 9/1966 | Henderson | 324—71 |
| 3,295,059 | 12/1966 | Coulter et al. | 324—71 |

OTHER REFERENCES

Wheeler et al., "Measurement of the Size Distribution of Spray Particles," Electronic Engineering, October 1953, TK 6630 AZT2, pp. 402–406.

RUDOLPH V. ROLINEC, Primary Examiner.

E. E. KUBASIEWICZ, Assistant Examiner.

U.S. Cl. X.R.

235—92; 328—127